United States Patent [19]
Sather

[11] 3,723,886

[45] Mar. 27, 1973

[54] PULSE STRETCHING APPARATUS

[75] Inventor: Delaine C. Sather, Cedar Rapids, Iowa

[73] Assignee: Collins Radio Company, Dallas, Tex.

[22] Filed: Feb. 11, 1972

[21] Appl. No.: 225,442

[52] U.S. Cl. ....................328/58, 307/267

[51] Int. Cl. ....................H03k 5/04

[58] Field of Search ......307/265, 267; 328/58; 332/9

[56] References Cited

UNITED STATES PATENTS 3,629,710 12/1971 Durland ....................328/58

3,668,560 6/1972 Padalino et al. ....................328/58 X

*Primary Examiner*—John Zazworsky

*Attorney*—Bruce C. Lutz et al.

[57] ABSTRACT

The present disclosure is directed toward apparatus for digitally expanding the length of a pulse. This is accomplished by using a unique count down circuit after the reception of an input pulse. An output pulse is obtained for the duration of the count down period. Other input pulses received during the count down period are ignored.

5 Claims, 1 Drawing Figure

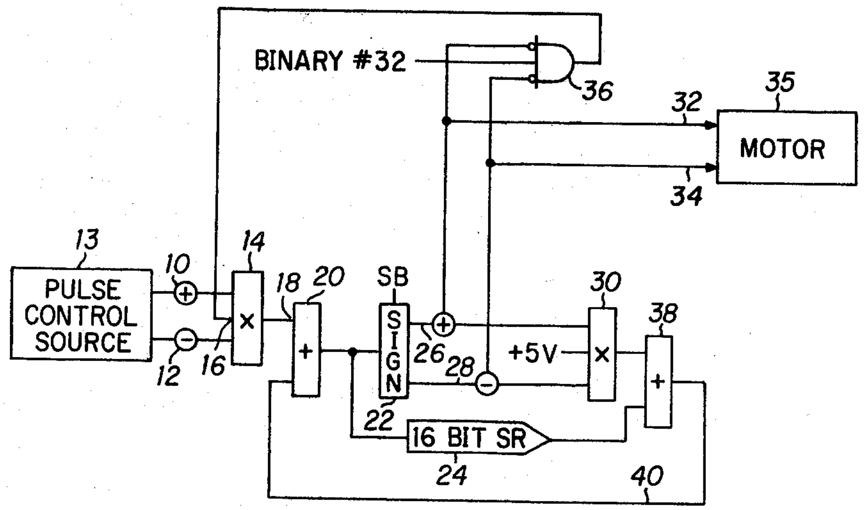
BINARY #32
36
32
35
MOTOR
34
13
PULSE
CONTROL
SOURCE
10
12
14
16
18
20
SB
SIGN
22
26
28
+5V
30
38
16 BIT SR
24
40

PULSE STRETCHING APPARATUS

THE INVENTION

The present invention is directed generally toward electronics and more specifically toward a circuit for amplifying the length of an input control pulse prior to its application to a load device such as a motor.

While there are many analog types of devices for expanding the length of an input pulse, these analog type devices are generally temperature sensitive and age sensitive. Thus, the length of the expansion is not constant. The present invention on the other hand utilizes completely digital techniques and therefore produces a much more stable output pulse length. The expansion is accomplished by taking an input pulse to activate a count down which will count down from a given value. The output is activated to its maximum amplitude immediately after the reception of the input pulse and stays at the maximum value until count down is completed at which time the output is reduced. The design of the present invention is such that it will accept either positive or negative input pulses and still produce the count down while providing expanded positive or negative pulses, respectively, at the output thereof.

It is thus an object of the present invention to provide an improved pulse expander.

Further objects and advantages of the present invention may be ascertained from a reading of the specification and claims in conjunction with the single FIGURE which provides a block diagram of the invention.

DETAILED DESCRIPTION

The present invention is a collection of blocks illustrated in more detail in my copending applications Ser. Nos. 5085 and 5086 entitled, "Integration and Filtration Circuit Apparatus" and "Digital Word Magnitude Selection Circuit Apparatus," respectively. These two applications are filed coincident with the present invention and are assigned to the same assignee as the present invention. I wish to incorporate all the pertinent contents of these two applications in the present invention for the purpose of illustrating in more detail the contents of various multiplying, summing, and sign detection blocks. As explained in the referenced applications, the multiplying, adding, and sign detection blocks are commercially available in various forms. The referenced applications provide illustrations of specific embodiments which have been utilized to practice the inventions in the referenced applications and in the present application.

Positive and negative input terminals 10 and 12, respectively, are shown connected from a pulse control source 13 to a multiplying block 14. The multiplying block 14 in addition to having the pulse input terminals 10 and 12 has a serial digital word input 16. An output is connected to a first input 18 of a summing means 20 which in this case is an adder. Summer 20 has an output connected to an input of a sign detection circuit 22 and also to an input of a shift register 24. The sign detection circuit 22 outputs are positive and negative terminals 26 and 28, respectively, and are connected to like inputs of a multiplying circuit 30. Additionally, they are connected to output terminals 32 and 34, respectively, which are connected to a motor or load 35. Further, they are connected to inverting inputs of an AND circuit 36. AND circuit 36 has an additional input label binary No. 32, which provides a digital word in binary form indicative of the numerical value 32 as a third input. An output of AND gate 36 is connected to input 16 of multiplying circuit 14. An output of multiplying circuit 30 is connected to a first input of a summing circuit 38 which receives a second input from the output of shift register 24. An output of summing circuit 38 is connected via a lead 40 to a second input of summing circuit 20. As will be noted, the two summing circuits 20 and 38 are both adding although the term "-summing" is intended, in all of the referenced applications, to include either adding or subtracting.

Although more detail may be obtained from the referenced application, a multiplying circuit such as 14 will receive a pulse input on either lead 10 or 12. A digital word input is received at input 16. The output signal supplied at the output of multiplier 14 will have the same absolute value as the digital word at input 16 but its polarity will be affected by the choice of terminals 10 or 12 to which the pulse input is applied. Further, this pulse input must last the entire length of the digital words supplied on 16. Thus, the multiplying circuit 14 is in actuality a multiply by pulse 1, zero or minus 1 circuit.

The summing circuits such as 20 receive two digital word inputs and combine these inputs to provide an output indicative of the sum whether it be adding or subtracting. If a positive and negative input word is received, the output will be the difference.

The sign detection circuit 22 checks the most significant bits of the incoming digital word from summing circuit 20 to determine polarity. The digital words utilized in the circuitry start with the least significant bit and as time proceeds increase towards the most significant bit. As is the conventional practice, a logic 0 in the most significant bit position indicates a zero or positive number while a logic 1 indicates a negative number. By inserting an activating flip-flop prior to the zero detecting flip-flop in the sign detection block 22, a detection can be made as to the difference between a numerically zero digital word and a numerically positive digital word. This is accomplished by using one of the ones which would exist prior to the most significant bit in a positive number to activate a first flip-flop and use the absence of a logic 1 in the most significant bit to activate a second flip-flop. More explanation may be obtained in the second referenced application.

Although not shown applied to most of the blocks, a sync bit supply is necessary which is coincident with the most significant bit of the incoming digital word and coincident with the end of the pulse applied to either input terminal 10 or 12. This is necessary to provide the proper switching action in the sign detection block 22. Other inputs which are not shown but are obvious to one skilled in the art are the power input leads.

In operation a pulse is applied to one of the input terminals such as 10. Since 10 is the positive input terminal, this allows passage of any digital words applied on 16 to be passed through multiplying circuit 14 to summing circuit 20. In an assumed initial condition, there would be no words for the sign detection circuit 22 to detect and thus both of the outputs 26 and 28 would be in a logic 0 condition. This occurs because sign detection circuit 22 does not activate either of its outputs when a numerically zero binary input is received as would be the case after the device had counted down to zero. With logic zeros being supplied on these two leads, there is no input to the motor on leads 32 and 34 and there is no input to AND gate 36. However, since these inputs are inverted, the AND gate 36 is activated and the binary number 32 is passed to the output and thus to the input of multiplying circuit 14. Therefore, the appearance of a pulse on lead 10 for the duration of one word time will pass the binary number 32 to summing circuit 20. Since it was assumed that the circuit was in its initial conditions, there would be no feedback word on lead 40. Thus, the binary 32 word is summed with nothing and passed to the sign detection circuit 22. Since this was indicated to be a positive number, the most significant bit would be a logic 0 and thus an output would appear on lead 26 during the next word time. An output on lead 26 would deactivate the AND gate 36 since the logic 1 inverted would fail to produce an unanimity of logic 1's at the input of this AND gate. However, a logic 1 is being applied to the motor on lead 32 to start a pulse. The +5 volt input to the digital input terminal of multiplying circuit 30 acts as a logic 1. As will be realized, the continuous appearance of a logic 1 is the same as a −1 binary input signal. Thus, the output as supplied to summing circuit 38 as a −1 even though the positive terminal 26 was activated. The numerical value of 32 was previously supplied to the shift register 24 at the time that it was supplied to sign detection circuit 22. Thus, a minus 1 is summed with the numerical value of 32 in the adding circuit 38 and an output of numerical 31 will result. This numerical 31 will return on lead 40 and be applied to summing circuit 20 during the next word time. In view of the activation to a logic 1 of lead 26, AND gate 36 no longer provides an output and thus, no input may be obtained from multiplying circuit 14 even though further pulses may be applied thereto. The numerical value 31 is then supplied through the summing circuit 20 which sums it with an input of binary 0 and applies it to the sign detection circuit 22 as well as shift register 24. Thus, the output 26 remains at a logic 1 value indicating that a positive number is still being applied thereby keeping AND circuit 36 in an OFF condition and the motor in an ON condition as indicated by the input lead 32. This activation of lead 26 also supplies a further −1 through multiplying circuit 30 to summing circuit 38 where it is added to the binary 31. Thus, during the next word time the output on lead 40 is a binary 30. This process of subtracting one during each word time continues until a binary 0 is obtained on lead 40. At this time the sign detection circuit fails to detect a positive word and the next word time the output lead 26 drops to a logic 0 so that it has the same value as lead 28. This terminates the pulse to the motor. Also, this now activates AND circuit 36 so that another pulse may be received from the control source on either lead 10 or 12. If the motor still has not positioned its load to the proper point, a further positive pulse may be received on lead 10.

The binary input of 32 has no particular significance except that with the clocking utilized in one embodiment of the invention, a near system optimum output pulse of 1 millisecond was obtained. Also, it may be desirable to decrement the circulating word by some number other than the "1" utilized in multiplier 30.

It may now be assumed that the motor has over shot its mark and the control or signal source now wishes it to reverse direction. In this instance a one digital word length pulse is applied to terminal 12. This results in a negative 32 being supplied to the summing circuit 20 as long as the shift register 24 contains a binary 0 number and thus the sign detection circuit 22 has logic 0 outputs on leads 26 and 28. The negative numerical 32 will be summed with a numerical zero in summing circuit 20 and applied to shift register 24 and sign detection circuit 22. In this case, however, the lead 28 will be raised to a logic 1 the next word time and a pulse commenced to the motor 35 on lead 34. The negative input lead to multiplying circuit 30 combined with the digital binary −1 will result in a positive 1 output as applied to the summing circuit 38. Thus, the summing circuit will combine a binary −32 with a binary +1 and will decrement toward zero the number in shift register 24 on each word time by a value of 1. Again, the AND gate 36 will be deactivated until there is no longer any numerical value digital word in the circuit.

While a single embodiment of the present invention has been disclosed, it is to be realized that other embodiments may be practiced and still fall within the pulse expanding concept of the present invention. Thus, I wish to be limited not by the specification and drawing but only by the scope of the claims.

I claim:

1. Apparatus for supplying an amplified version of a pulse at an output as compared to a pulse received at an input comprising, in combination:
   - first signal means for supplying input pulses of first and second polarities;
   - digital count down means including input means and output means, the count down means having a count down time period proportional to the numerical value of a digital word supplied to said input means thereof and providing an amplified output signal pulse at said output means thereof having a polarity indicative of the polarity of an initially received input pulse supplied to said input means thereof and of a duration equivalent the time period of said count down means;
   - second signal means for supplying a digital word of a given numerical value to said count down means; and
   - means connecting said first and second signal means to said input means of said count down means for supplying pulses and digital words thereto.

2. Apparatus as claimed in claim 1 wherein said second signal means comprises gating means connected to said output means of said count down means for preventing further applications of said digital word until cessation of the amplified output pulse from said count down means.

3. Apparatus as claimed in claim 2 comprising in addition load means connected to said output means of said count down means for receiving the amplified pulses of first and second polarities.

4. Apparatus as claimed in claim 2 wherein said count down means comprises, in combination:
   - multiplying means for multiplying the digital word received input signal times the polarity of a received pulse and providing a polarized digital word output;

first summing means including first and second input means and output means for combining received digital words applied to said input means, said first input means being connected to said multiplying means for receiving the output therefrom;

sign detection means, including input means and output means, for providing apparatus output positive or negative signals in accordance with the polarity of received digital input signals for a time period equivalent to the time that digital word input signals of an absolute value greater than zero are supplied to the input means thereof;

second summing means including first and second input means and having an output connected to said second input of said first summing means;

word storage means, including input means and output means, having a time delay therethrough equivalent to the word length of the digital word input supplied by said second signal means;

means connecting said output of said first summing means to the input means of said sign detection means and said word storage means;

means connected between said output means of said sign detection means and said first input means of said second summing means for supplying a decrementing digital word input thereto; and means connecting said output means of said word storage means to said second input means of said second summing means, the digital word circulating in said count down means being periodically decremented in said second summing means over a time period directly related to the magnitude of the digital word supplied by said second signal means.

5. Apparatus as claimed in claim 4 wherein said word storage means is a shift register and wherein said decrementing means is a further multiplying means for multiplying an input digital word by an input logic level to provide a digital word output having a polarity for decrementing the word received from said shift register means and in accordance with the polarity of the output signal pulse supplied to said load means.

* * * * *